United States Patent [19]

Despouys

[11] 4,368,948
[45] Jan. 18, 1983

[54] OPTICAL FIBER CONNECTOR AND METHOD

[75] Inventor: Jean-Bernard Despouys, Paris, France

[73] Assignee: Radiall, Rosny-Sous-Bois, France

[21] Appl. No.: 93,916

[22] Filed: Nov. 13, 1979

[30] Foreign Application Priority Data

Nov. 13, 1978 [FR] France ............................. 78 31953

[51] Int. Cl.³ .............................................. G02B 5/14
[52] U.S. Cl. .................................. 350/96.20; 350/320
[58] Field of Search ............................ 350/96.20, 320

[56] References Cited

U.S. PATENT DOCUMENTS

| | | | |
|---|---|---|---|
| 4,148,557 | 4/1979 | Garvey | 350/96.20 |
| 4,176,909 | 12/1979 | Prunier | 350/96.2 |
| 4,208,093 | 6/1980 | Borsuk | 350/96.21 |
| 4,229,876 | 10/1980 | Doty | 350/96.21 |
| 4,261,774 | 4/1981 | Lewis et al. | 350/96.21 |

Primary Examiner—John K. Corbin
Assistant Examiner—Rodney B. Bovernick
Attorney, Agent, or Firm—Brisebois & Kruger

[57] ABSTRACT

A process for placing an optical fiber in a connector tip or ferrule and a connector tip for this process. The process is characterized by the fact that an outside protective sheath is removed along a predetermined length from one end of the fiber and the fiber is threaded through the connector top so that a portion of the fiber so stripped of its outside sheath is within the connector tip with the remaining stripped portion of the fiber projecting from the front end of the connector tip. The connector tip is then joined to the portion of the fiber still bearing its outside sheath by crimping and then that portion of the fiber stripped of its outside sheath is cut near the front end of the connector tip.

7 Claims, 8 Drawing Figures

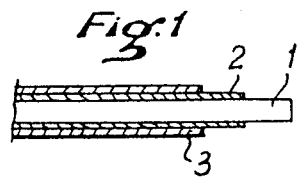
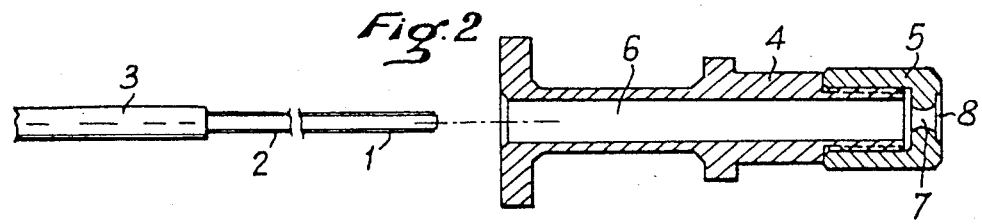
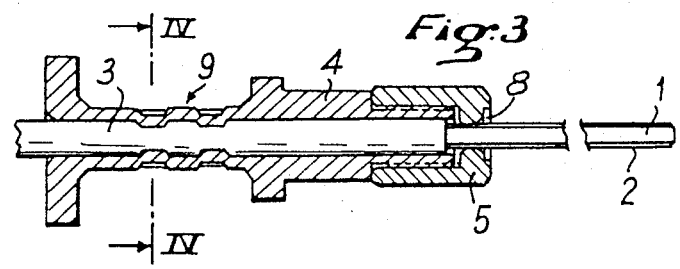
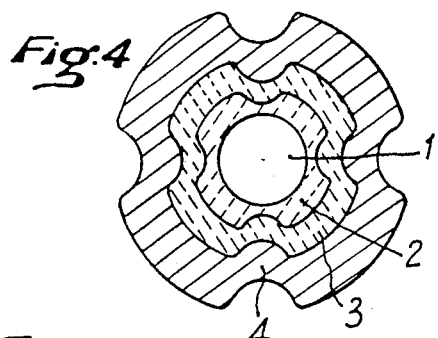
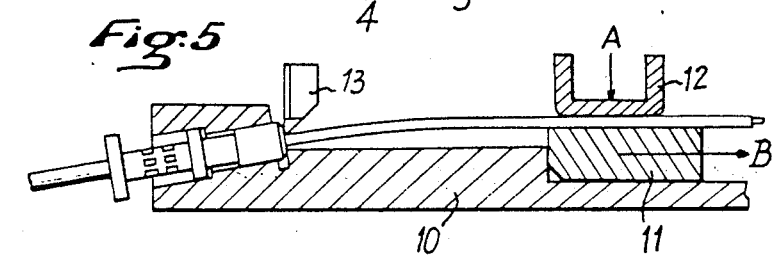
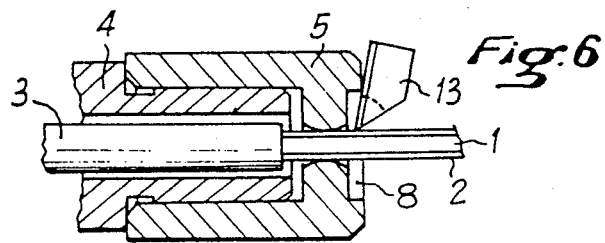

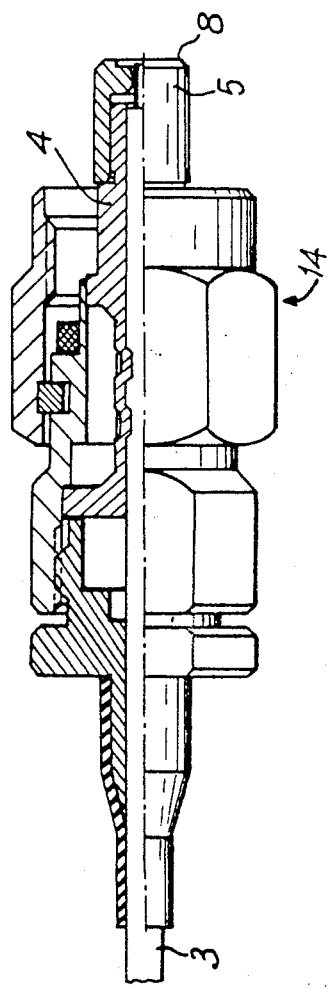
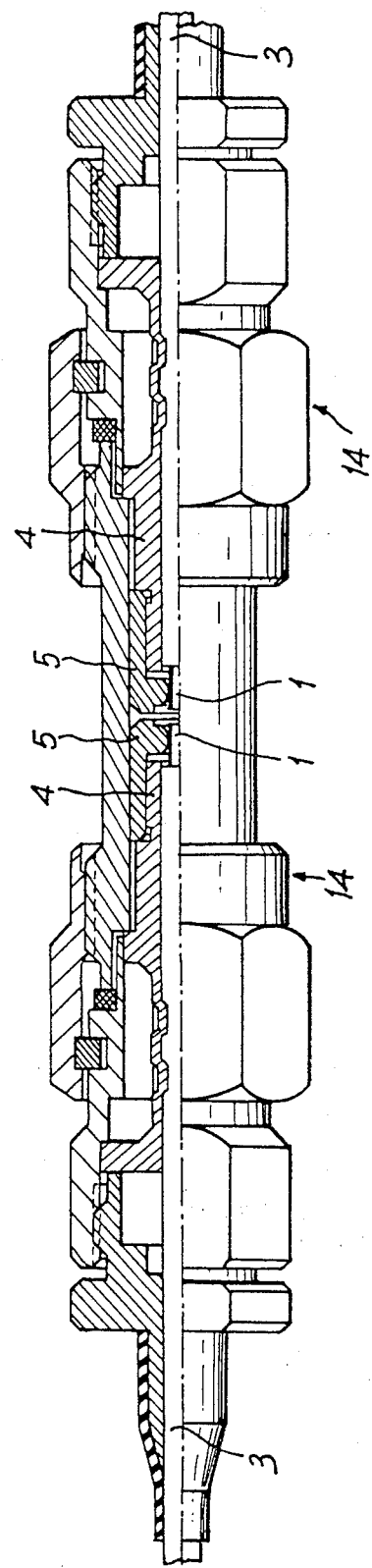

OPTICAL FIBER CONNECTOR AND METHOD

BACKGROUND OF INVENTION

The present invention relates to a process for placing an optical fiber in a connector tip as well as to a connector tip or ferrule for this process.

More particularly, the invention relates to the connection of optical mono-fibers. Such fibers comprise a core, a casing or "cladding", and an outside sheath for mechanical protection. In order to assure the alignment of luminous flux in the core of the fiber, the refraction index of the core is greater than the refraction index of the cladding. Thus, fibers have been made whose core is pure silica and where the casing is made of silicone. The outside sheathing for mechanical protection is made of plastic material, for example, that known commercially under the name "TEFZEL".

The major difficulty encountered in the end-to-end connection of such fibers is the fact that the silicone of the casing or the sheathing is soft and fragile which requires delicate handling of the fiber after removal of the outside protective sheathing.

The known processes for connecting such optical fibers include removing from the end of each fiber both the outside protective sheathing and the silicone sheathing. The fiber with its core open to the air is then inserted in a connector tip and immobilized either by direct cementing of the core or by mechanical restraint of the outside sheathing, with the core remaining movable. However, all of the known processes have the disadvantage of creating optical perturbations in the fiber at the level of the connector and so there exists significant losses at the connection, such losses being on the order of 3 dB. Moreover, placement of the fiber in the connector tip leads to an imprecise positioning and also risks pollution of and damage to the exposed end of the fiber core.

SUMMARY OF INVENTION

The present invention provides a process for placing an optical fiber in a connector tip while specifically avoiding the disadvantages of the previously known processes and yet yielding losses to the connection on the order of only 1 dB. Due to the process according to the present invention, it is possible not to disturb the optical characteristics of the fibers in the area of the connection, and to mechanically locate with precision the end of the core of the fiber to be connected while using simple reproducible operations for placing the fiber in the connector tip.

The process according to the present invention is characterized by removing the outside protective sheathing along only a certain length from one end of the fiber without removing the casing or inner sheath. The fiber is then threaded through a connector tip so that the portion of the fiber is stripped of its outside sheathing is contained in the connector tip and the remaining portion of the fiber stripped of its outside sheathing is projecting from the front end of the connector tip. The connector tip is then joined by crimping with the portion of the fiber still bearing its outside sheathing and then the portion of the fiber stripped of its outside sheating is severed in the vicinity of the front end of the connector tip.

In one preferred embodiment, the connector tip has in its front end zone a narrow central passage for the fiber stripped of its outside sheathing and this passage has a volume of revolution around the axis of the tip defined by the inside wall of the end of the tip having a shape which is convex toward the interior. This passage opens through a spot face or recess in the front face of the connector tip. The dimensions of the passage are chosen so that the casing or "cladding" of the fiber is slightly compressed in the area of the narrow passage. This ensures perfect centering of the core of the fiber with respect to the connector tip. This also allows for the absorption of possible variations in the diameter of the sheathing of the fiber.

One particularly useful connector tip according to the present invention comprises an end barrel assembled with or in a single piece with a supporting sleeve made of a deformable metal which can be crimped. Thus, after the fiber is stripped of its outside sheathing and has been inserted in the tip so that a portion of the fiber stripped of its outside sheathing is located in the passage in the barrel of the tip of the connector, the fiber is immobilized in the tip by crimping the sleeve. This crimping is carried out so as to compress both the outside sheathing of the fiber and the casing without reaching the core of the fiber. Preferably, multi-notch crimping is used which perfectly unites the fiber with the connector tip and does not create any discontinuity of the sheathing at the periphery of the core thus keeping intact the optical characteristics of the fiber after its placement in the tip.

To sever the end of the fiber stripped of the outside sheathing, it is particularly useful to immobilize the end of the fiber extending beyond the connector tip after slightly curving the end of the fiber. A rupture nick is begun on the casing and the core of the fiber at a point slightly behind the front face of the connector tip and an axial pull is exerted on the other end of the fiber. The sheathing and the core of the fiber are thereby fractured cleanly orthogonally to the axis straight below the starting rupture.

To connect two optical fibers, a connector tip is placed on each of them, after which each of the connector tips is placed in a connector element and joined so that the fibers are aligned end to end. It is also possible to place several connector tips in which optical fibers have been placed into a single connector of the optical multi-channel type.

IN THE DRAWINGS

In order to make the invention better understood, one embodiment will now be described by way of example and is in no way limiting by referring to the attached drawings in which:

FIG. 1 is a view in longitudinal section showing the structure of an optical fiber which can be used with the present invention;

FIG. 2 is a view in section showing an optical fiber and connector ferrule prior to assembly;

FIG. 3 is a view like FIG. 2 and shows the connector ferrule after placement of the optical fiber;

FIG. 4 is a section along line IV–IV of FIG. 3;

FIG. 5 shows schematically a device for severing the end of the fiber;

FIG. 6 shows an enlarged view of the end of the connector tip during severing, using the device shown in FIG. 5;

FIG. 7 is a view in partial longitudinal section of a connector element including a connector ferrule which has received an optical fiber emplaced by the process of the present invention; and, FIG. 8 shows a connector resulting from the assembly of two of the connector elements shown at FIG. 7.

DETAILED DESCRIPTION

FIG. 1 shows in section an optical monofiber for the connection of which the present invention is most particularly useful.

This fiber has a core 1 of pure silica, a casing or cladding 2 of silicone, and an outside protective sheathing 3 of plastic material.

To implement the process according to the present invention, such a fiber is stripped by the withdrawal from one end of the outside protective sheathing 3 along a distance on the order of 40 mm. The stripped portion of the fiber thus includes not only the core 1 but also the casing 2.

As shown in FIG. 2, the fiber thus stripped of its front portion is then inserted into a connector ferrule or tip having a support sleeve 4 preferably made of a deformable metal material, and a barrel 5. The sleeve 4 and the barrel 5 may be assembled by any mechanical means or may even be made in a single part.

Sleeve 4 has along its entire length in internal axial opening or bore 6 which opens at the front end into a narrow passage 7 in the front portion of the barrel 5.

This passage 7 has the form of a volume of revolution around the axis of the connector tip and this volume being defined by the internal wall of the end of the barrel which has a convex shape toward the interior.

The dimensions of the passage 7 are chosen so that the casing 2 of the fiber is slightly compressed in the area of passage 7.

The front end of this passage opens onto an end spot face 8 at the front face of the connector ferrule.

After the fiber has been placed in the ferrule in the position shown in FIG. 3, the fiber is fixed in the ferrule by crimping, as shown at 9 in FIG. 3.

FIG. 4, which is a sectional view of FIG. 3 in the area of crimping, shows that the crimp is a multi-notched crimp causing a deformation of the material of a sleeve 4, of the outside protective sheathing 3 of the fiber, and of the casing 2, but without involving core 1.

FIGS. 5 and 6 show the final step of the process of the present invention during which the front stripped portion of the fiber extending beyond the connector tip is severed.

As shown in FIG. 5, the connector tip is placed in an inclined position in the severing device 10, so as to provide the stripped portion of the fiber a slightly curved shape.

The front portion of the fiber is held in a movable carriage 11 which includes a device 12 for clamping the fiber.

Arrow A shows the effect of the clamping pressure and arrow B indicates the direction of movement of the carriage. By means of a diamond knife 13, which may be moved, a starting rupture is made on casing 2 and core 1 of the fiber at a point slightly behind the front face of barrel 5 of the ferrule; and inside spot face 8, as seen in FIG. 6.

The cutting axis of knife 13 is tilted with respect to a perpendicular to the axis of the fiber extending out of the connector tip.

After the starting rupture or nick is made, carriage 11 is moved in the direction of arrow B with the fiber still held by clamping means 12. This insures a clean orthogonal fracture of casing 2 and core 1 of the fiber below the starting rupture. Such a severing or sectioning device allows the region of rupture of the fiber to be positioned with respect to the ferrule with a precision of better than 0.02 mm.

To connect two optical fibers, each fiber is placed in a connector ferrule by the process described above, after which each connector ferrule is placed in a connector element 14 shown in FIG. 7. Two such connector elements 14 are then assembled, as shown in FIG. 8, with the optical fibers then being aligned and their connection thus being made.

Although the invention has been described in connection with one preferred embodiment, it is thereby in no way so limited and may undergo various modifications without exceeding its scope or its basic principles.

What is claimed is:

1. A process of connecting an optical monofiber in a connector ferrule comprising the steps of, providing an optical monofiber having a core, a silicone casing extending around said core, and an external protective sheath extending around said silicone casing, stripping the protective sheath from an end of the fiber without removing said casing to provide a stripped end, providing a connector ferrule unit devoid of adjustable parts, said ferrule unit having a front end and a rearward end, said front end comprising a narrow central passage having the shape of a volume of revolution around the axis of the ferrule which is convex toward the interior of the passage, said passage having a diameter slightly less than the diameter of the silicone casing of the fiber to slightly compress the casing when the fiber is inserted in the passage, said passage opening onto an end spot face at the front face of the ferrule, inserting the fiber into the ferrule unit to a position in which a portion of the stripped end within the ferrule unit is slightly compressed within the central passage thereof and a length of the stripped end projects from the front end of the ferrule unit and an unstripped portion of the fiber still having the external sheath is within the connector ferrule unit, fixing the connector ferrule unit to the unstripped portion of the fiber, and then severing the stripped portion of the fiber at a precise predetermined location closely adjacent to the front end of the connector ferrule unit to provide an optical end face of the fiber at a precise position adjacent to the front end of, and fixed with respect to the connector ferrule unit.

2. A process according to claim 1 wherein said severing of the fiber comprises severing the stripped portion of the fiber at a location inwardly of the front face of the fiber to provide an optical end face within the spot face of the ferrule.

3. The process according to claim 1 wherein said step of fixing said connector ferrule unit to said fiber comprises, crimping a portion of the ferrule unit onto the unstripped portion of the fiber.

4. The process according to claim 3, wherein said step of crimping comprises multi-notched crimping of the connector ferrule unit onto the fiber to fix the connector ferrule unit to the fiber.

5. Process according to claim 1 or claim 3, wherein said step of severing the stripped end of the fiber comprises holding the end of the fiber projecting from the front end of the connector ferrule unit in a slightly curved shape, causing a starting rupture of the stripped fiber at a point slightly behind the front end of the connector ferrule, and exerting an axial pull on the stripped projecting end of the fiber.

6. An optical fiber connector ferrule unit comprising a crimpable sleeve and a barrel fixed to the front end of the sleeve, said crimpable sleeve comprising means for securing the connector to the outside sheath of an unstripped portion of the fiber inserted in the ferrule, said barrel having a narrow central passage to receive as a close fit therein an end portion of the optical fiber stripped of its outside sheath, said passage being defined by the inside wall adjacent the end of the barrel and having the shape of a volume of revolution around the axis of the ferrule of a shape convex toward the interior, and wherein the front portion of said passage opens into a spot face formed in the front face of the barrel.

7. A connector ferrule according to claim 6, wherein the sleeve comprises a deformable metal sleeve comprising means for crimping the sleeve onto the optical fiber.

* * * * *